US010657326B2

United States Patent
Brugler et al.

(10) Patent No.: US 10,657,326 B2
(45) Date of Patent: May 19, 2020

(54) REMOVABLE SPELL CHECKER DEVICE

(71) Applicant: International Business Machines Corporation, Armonk, NY (US)

(72) Inventors: Thomas S. Brugler, Fuquay-Varina, NC (US); John F. Kelley, Polk City, FL (US); Todd P. Seager, Orem, UT (US); Douglas Brown, Charlotte, NC (US)

(73) Assignee: International Business Machines Corporation, Armonk, NY (US)

( * ) Notice: Subject to any disclaimer, the term of this patent is extended or adjusted under 35 U.S.C. 154(b) by 121 days.

(21) Appl. No.: 15/602,355

(22) Filed: May 23, 2017

(65) Prior Publication Data

US 2018/0341634 A1    Nov. 29, 2018

(51) Int. Cl.
*G06F 40/00* (2020.01)
*G06F 40/232* (2020.01)
*G06F 3/0354* (2013.01)

(52) U.S. Cl.
CPC ........ *G06F 40/232* (2020.01); *G06F 3/03545* (2013.01)

(58) Field of Classification Search
CPC .... G06F 17/214; G06F 17/273; G06F 40/232; G06F 3/03545
USPC ....................................................... 715/257
See application file for complete search history.

(56) References Cited

U.S. PATENT DOCUMENTS

| | | | | |
|---|---|---|---|---|
| 5,802,205 A | * | 9/1998 | Emico | G06K 9/00865 382/187 |
| 6,054,990 A | * | 4/2000 | Tran | G06F 3/0481 345/179 |
| 6,219,453 B1 | * | 4/2001 | Goldberg | G06K 9/03 382/229 |
| 7,453,439 B1 | * | 11/2008 | Kushler | G06F 3/0237 345/168 |
| 7,750,891 B2 | * | 7/2010 | Stephanick | G06F 3/0236 178/18.01 |
| 8,358,964 B2 | * | 1/2013 | Radtke | G06F 3/03545 345/179 |
| 8,944,824 B2 | * | 2/2015 | Marggraff | G09B 11/00 345/169 |
| 9,064,169 B2 | * | 6/2015 | Suzuki | G06F 3/041 |
| 10,032,071 B2 | * | 7/2018 | VanBlon | G06F 17/242 |
| 2005/0024346 A1 | * | 2/2005 | Dupraz | G06F 3/03545 345/179 |
| 2005/0125228 A1 | * | 6/2005 | Samuels | G09B 19/06 704/260 |
| 2008/0155398 A1 | * | 6/2008 | Bodin | G06F 17/273 715/257 |
| 2008/0181501 A1 | * | 7/2008 | Faraboschi | G06F 3/03545 382/179 |

(Continued)

OTHER PUBLICATIONS

"Slap-Penz", Copyright 2012-2013 Slap-Penz, 3 pages, https://web.archive.org/web/20130426095506/http://slap-penz.com/.

(Continued)

*Primary Examiner* — Laurie A Ries
(74) *Attorney, Agent, or Firm* — Daniel C. Housley

(57) ABSTRACT

A computer system identifies hand strokes generated while a user produces handwritten text. Based on the hand strokes, characters are identified. Based on the characters, words are identified. The words are checked for spelling, and the user is notified of any misspelled words.

20 Claims, 6 Drawing Sheets

(56) References Cited

U.S. PATENT DOCUMENTS

| | | | | |
|---|---|---|---|---|
| 2009/0015567 A1* | 1/2009 | Abdelbaki | .......... | G06F 3/03545 345/179 |
| 2010/0039296 A1* | 2/2010 | Marggraff | ........... | G06F 3/03545 341/20 |
| 2011/0223568 A1* | 9/2011 | Colandreo | ............ | G06F 17/273 434/169 |
| 2012/0029907 A1* | 2/2012 | Loggins | ................. | G09B 19/06 704/9 |
| 2015/0169975 A1* | 6/2015 | Kienzle | .................... | G06K 9/34 382/189 |
| 2015/0336421 A1* | 11/2015 | Neubauer | .............. | B43K 29/10 434/159 |

OTHER PUBLICATIONS

Duckett, "Google Chrome takes spell checking into the cloud", Mar. 2013, ZDNet, 13 pages.

Brugler et al., "Removable Spell Checker Device", U.S. Appl. No. 15/890,426, filed Feb. 7, 2018.

List of IBM Patents or Patent Applications Treated as Related, dated Feb. 2, 2018, pp. 1-2.

Accelerated Examination Support Document, dated Jan. 16, 2018, 20 pages.

Garber, "News Briefs: High-Tech Pen Checks Spelling while Users Write", Published by the IEEE Computer Society Sep. 2013, © 2013 IEEE, 3 pages.

Phillips, "The Spell-Checking Pencil", Working Up, Feb. 28, 2011, 6 pages. http://dwaynephillips.net/workingup/2011/02/thespellcheckingpencil/.

Mell et al., "The NIST Definition of Cloud Computing", Recommendations of the National Institute of Standards and Technology, U.S. Department of Commerce, Sep. 2011, 7 pages.

Lernstift, "Lernstift, the first pen that vibrates when u make a mistake", Kickstarter, printed on May 22, 2017, 25 pages. https://www.kickstarter.com/projects/lernstift/lernstift-the-first-pen-that-vibrates-when-u-make.

* cited by examiner

REMOVABLE SPELL CHECKER DEVICE

BACKGROUND

The present disclosure relates generally to the field of motion detection, and more particularly to identifying misspelled handwritten words.

Identifying and correcting a misspelled word during the act of writing necessarily means notifying the writer. Many word processing programs underline or highlight misspelled words, and editors or other observers may verbally or otherwise call the misspelling to the attention of the writer. In some circumstances, it may be desirable for the writer to receive a notification of a misspelled word as discreetly as possible. For example, a writer may be using a whiteboard and marker to give a presentation to an audience of colleagues and/or clients.

SUMMARY

Disclosed herein are embodiments of a method, system, and computer program product for identifying misspelled handwritten words.

A spell checker device removably attached to a writing instrument identifies, by a hand stroke detection module, hand strokes made using the writing instrument. Based on one or more hand strokes, characters are identified. Based on one or more characters, a word is identified. A determination is made regarding whether the word is misspelled. In response to determining that the word is misspelled, a user is notified.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1:
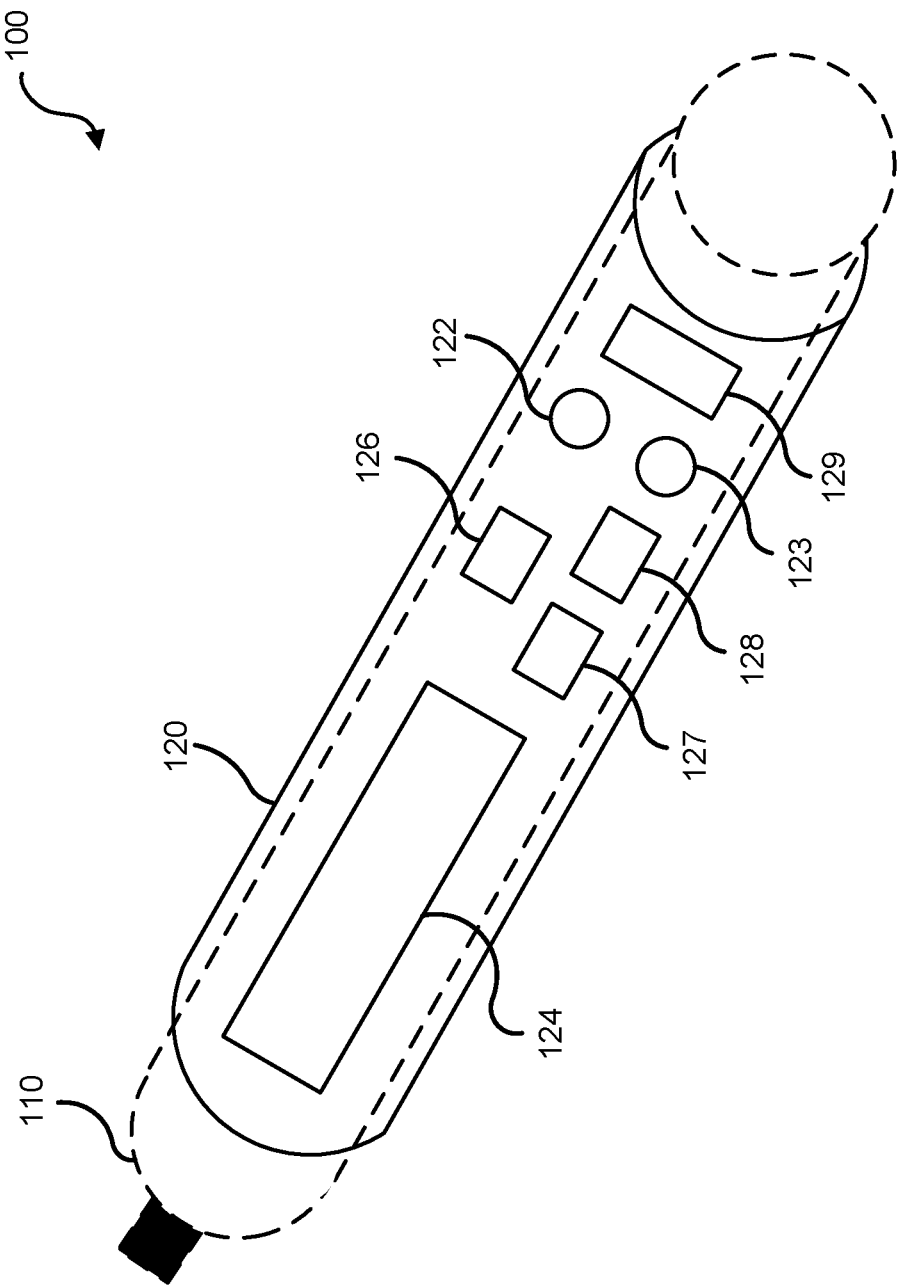
FIG. 1 illustrates a diagram of a removable spell checker device removably attached to a writing instrument, according to embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to motion detection, and more particularly to identifying misspelled handwritten words. While the present disclosure is not necessarily limited to such applications, various aspects of the disclosure may be appreciated through a discussion of various examples using this context.

Producing handwritten text in front of an audience can be nerve-wracking and stressful. Ensuring that the text is correctly spelled is one more stressor on the writer. While some people are excellent spellers, other people may experience elevated levels of stress at the thought of misspelling a word in front of an audience in various settings, such as during a presentation to clients, colleagues, an organization's leaders, etc.

An additional stressor may be the fear of having a misspelling pointed out by an audience member, or perhaps noticing a misspelling after a presentation is over and realizing that all the attendees saw the mistake. A system for spell checking handwritten text and discreetly notifying the user may be helpful in reducing stress and improving presentations and handwriting.

In various settings, different means may be present for producing handwritten text. For example, a room may be equipped with a whiteboard, a chalkboard, paper and pencils/pens/markers, etc. Therefore, embodiments of the present disclosure may be directed to a spell checker system including a spell checker device that is both attachable to and removable from a variety of writing instruments (e.g., removably attached to a writing instrument). For example, in embodiments, the system may include a sleeve-like component (e.g., a spell checker device) to encompass writing instruments. In other embodiments, the system may include a "slap-on" component. A "slap-on" component may include a spell checker device mounted on a bistable metal spring. A bistable metal spring is a spring that has two positions of operation, or two stable states of being. In embodiments, any other material capable of bistability may be used. The first state is an elongated (e.g., detached) position that retains potential energy. This potential energy will cause the band to coil when the bistable metal spring is struck against an object, such as a writing instrument, a wrist, etc. The second state (i.e., removably attached state) is the coiled state form the bistable metal spring takes when slapped around a writing instrument, a wrist, etc.

A "slap-on" component, like a slap-on bracelet that conforms to a wrist, may be one that conforms to the different circumferences of various writing instruments, and may use contact friction forces or bistable spring forces to remain attached to (e.g., coiled around) the writing instrument, without the use of adhesive compounds or invasive structures, such as bolts or screws, or other bulky structures, such as latches or locks. Because such an embodiment may be removable and attachable to writing instruments of various sizes and circumferences, it may enable a single removable component to be used with a wide variety of writing instruments, such as pencils, pens, markers, highlighters, whiteboard markers, chalk sticks, styli, etc. In embodiments, the entirety of the system may be contained in the removable component, or the system may include several components in addition to the removable component, as described herein.

In embodiments, a removable component may include a motion detecting sensor that enables data associated with the user's hand strokes to be captured as the user writes. In embodiments, a motion detecting sensor may be a spatial tracking sensor that tracks position over time. Captured hand strokes may be associated with alphanumeric or other characters, and the characters may be associated with words. In embodiments, hand stroke data (e.g., information regarding the characters/symbols a set of hand strokes represents or is associated with) may be stored in individual user profiles and/or databases with hand stroke data from a plurality of users. In embodiments, the system may identify misspellings and alert the user discreetly. For example, upon detected a misspelling, the removable component may produce a gentle vibration to alert the user of a misspelling, or it may send a notification to a companion device, such as an earbud or other wearable device, or the user's smartphone, tablet, laptop, etc. In embodiments, the system may include an optical device worn by the writing user. Such an optical device may include smart glasses capable of recognizing handwritten text and superimposing alternative spellings of words over misspelled handwritten text in the user's field of vision.

In embodiments, the removable may include a display, such as an LCD display, and may, upon detecting a misspelled word, display the correct spelling of the word, or list any number of words with similar spellings for the user. In embodiments, the user may have the option to add the word to a dynamic list of words. For example, if the user writes a word that the user is confident is spelled correctly, but is not present in the system's list of recognized words, the user may direct the system, using the removable component, a companion device, or other means, to accept the word as a new word. In embodiments, a writing user may spell a word correctly, and yet a character may be misidentified by the system (e.g., the writing user writes an "o," but the system identifies it as an "e"), thereby resulting in a "false positive" where the system misidentifies a word as misspelled. The writing user may direct the system to accept the word as a correctly spelled word. For example, the removable component may include buttons or other input devices for accepting the word as spelled by the writing user and/or to add the word to a dynamic word list. In embodiments, the device may be communicatively coupled, via wireless or physical connection, to a desktop, laptop, tablet, or other computing device which may be used to manipulate the system's word list.

In embodiments, the system may also be connected, via an interactive user interface, such as a streaming app or other means, to the devices of several non-writing users. Non-writing users may then be capable of sending a discreet notification, via one or more companion devices, to the writing user to notify the writing user of a misspelling. This may be particularly helpful in identifying homonymic or contextual misspellings.

In embodiments, the system may be capable of recording the handwritten text to perform natural language processing (NLP) techniques. In such embodiments, and system may be capable of increased spelling accuracy by using contextual clues to assist in identifying the correct spelling of any given word.

In embodiments, the system may utilize user profiles and hand stroke analysis to adapt to the anomalies and nuances present in a particular user's handwriting. For example, the system may be capable of differentiating between users (e.g., through the use of user profiles), based on individual quirks or writing styles, such as cursive versus manuscript handwriting. This may also be useful when a user produces two different letter characters that appear nearly identical. For example, a user may write a's, o's, and e's in a manner that makes those characters virtually indistinguishable to a reader. In embodiments, the system may be capable of tracking visually insignificant differences in the user's hand strokes, and thereby differentiate and adapt to a particular user's writing style and quirks.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service deliver for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources, but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure, but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities, but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

The present disclosure will now be described in detail with reference to the Figures. FIG. 1 illustrates a diagram of a removable component of a spell checker system attached to a writing instrument, according to embodiments. In embodiments, the removably attached spell checker may include a writing instrument 110 and a removably attached spell checker component 120. The writing instrument 110 may be any writing instrument capable of attaching to the removable spell checker component 120, for example, a pencil, pen, marker, highlighter, chalk stick, whiteboard marker, etc. In embodiments, the writing instrument 110 may also be a non-marking instrument, such as, for example, a stylus. In embodiments, the removable spell checker component 120 may, for example, have a sleeve-like shape, into which a writing instrument 110 may slide to attach. In embodiments, the removable spell checker component 120 may be a "slap-on" device, as described herein, which may curl, entirely or partially, around the writing instrument 110 to attach thereto; and may be removed by uncurling the removable spell checker component 120 from around writing instrument 110.

In embodiments, the removable spell checker component 120 may include a motion sensor 122 for tracking a user's hand position and hand strokes as a user produces handwritten text, and a vibrator 123 for discreetly notifying the user of a misspelled word via vibration. For example, if the motion sensor 122 tracks the writing user's hand strokes and it is determined that a word is misspelled, the vibrator 123 may be engaged to discreetly notify the user that a word has been misspelled.

In embodiments, the removable spell checker component 120 may include a display 124 for displaying suggested spellings of a word the writing user has misspelled. For example, if a writing user misspells a word, the display 124 may show a list of correctly spelled words that most closely match the misspelled word. For example, if the writing user has written "wierd," the display may show the correctly spelled words "weird," "wired," and "wire." The display 124 may also be used to display menu options or other information to the user.

In embodiments, the removable spell checker component 120 may include inputs 126, 127, and 128. Inputs may be buttons, interactive areas of a touchscreen, or any other signal-producing structure that a writing user may use to interact with the removable spell checker component 120. For example, inputs 127 and 128 may be scrolling controls to enable a user to scroll through the list of correctly spelled words, and input 126 may be an input for selecting the desired correctly spelled word, or it may be an override input to signal the removable spell checker component 120 to either disregard the misspelled word, or to add the misspelled word to a word list. For example, if the writing user has written an acronym or esoteric term, the removable spell checker component 120 may not recognize the word(s) and flag them as misspelled. In this example, input 128 enables the user to either disregard the misspelled word, or to add it to the removable spell checker component 120's list of correctly spelled words.

In embodiments, the removable spell checker component 120 may include a data input/output port 129. Data input/output port 129 may be a wireless port, such as a Wi-Fi or BLUETOOTH port, or a port or requiring a physical connection, such as a USB port. Data input/output port 129 may enable a user to connect the removable spell checker 120 to a companion device, as described herein, or to another computing device. Data input/output port 129 may, for example, enable a user to receive discreet notifications of a misspelled word on a companion device, receive notifications of a misspelled word from non-writing users, interact with the removable spell checker component 120's word list, charge the removable spell checker component 120's battery, etc.

Figure 2:
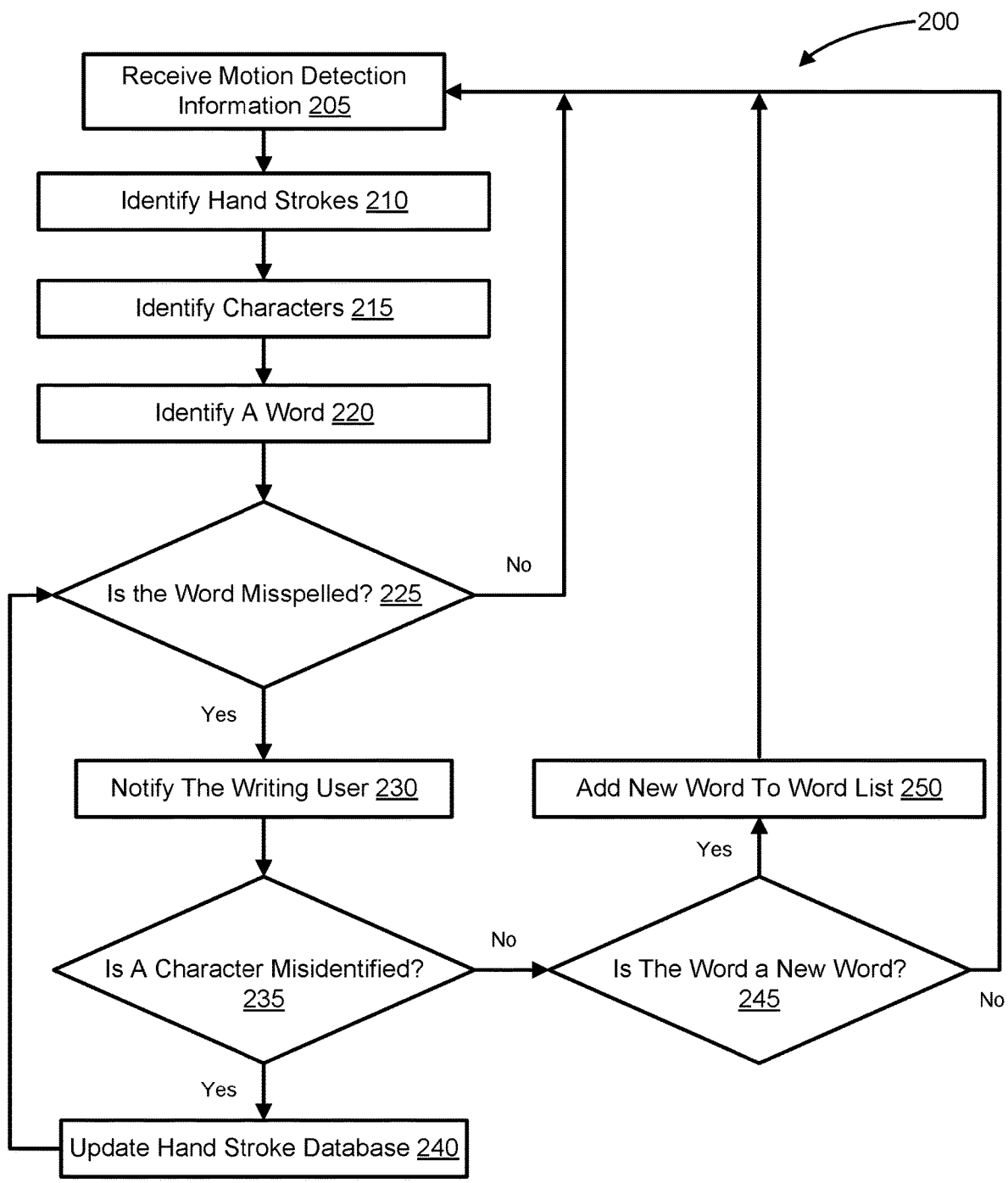
FIG. 2 illustrates a flowchart of a method for identifying a misspelled word and notifying a user, according to embodiments.

FIG. 2 illustrates a flowchart of a method 200 for identifying a misspelled word and notifying a user, according to embodiments. Method 200 may be performed, partially or entirely, by a removable spell checker component, such as, for example, removable spell checker component 120 shown in FIG. 1, or by a remote device communicatively coupled to a removable spell checker component, such as, for example, the remote device 360 shown in FIG. 3.

At 205, motion detection information may be received. Motion detection information may include, for example, the hand positions of a writing user over time. For example, a writing user's hand positions will change as the writing user produces handwritten text on the whiteboard.

At 210, hand strokes may be identified. For example, a writing user's hand positions over time may be analyzed to determine the writing user's hand strokes made during the production of handwritten text.

At 215, characters may be identified. For example, a writing user's hand strokes may be analyzed to determine which alphanumeric character the hand strokes represent. For example, a database containing hand strokes associated with alphanumeric characters may be queried to determine which alphanumeric character's associated hand strokes most closely resemble the writing user's hand strokes.

At 220, a word may be identified. For example, alphanumeric characters and breaks in hand strokes may be analyzed to determine which word the writing user has written. For example, the alphanumeric character string between two hand stroke breaks may be compared to a word list to determine which word the alphanumeric character string represents, or is meant to represent.

At 225, it is determined whether the identified word is misspelled. For example, if the writing user produces a word that does not appear in a word list, it may be determined that the produced word is misspelled. For example, if a writing user has written "tomatoe," a comparison to a standard word list may result in no match, and subsequently a determination that "tomatoe" is a misspelled.

At 230, the writing user may be notified. For example, if, at 225, it is determined that a word is misspelled, the writing user may be alerted, and alternative spellings (e.g., correct spellings) may be presented. For example, if the writing user produces the misspelled word "garge," a removable spell checker component, such as the removable spell checker component shown in FIG. 1, may vibrate and display the words "garage," "gargle," and "grange."

At 235, it may be determined whether a character is misidentified. For example, a device performing method 200 may misidentify a handwritten character. For example, an "m" may be misidentified as an "n," thus creating a "false positive" that a word is misspelled. For example, while a writing user may write "machine," a device performing method 200 may mistakenly determine that the writing user wrote "nachine," and flag it as misspelled. The writing user may provide input directing the system to accept the misidentified "n" as an "m."

At 240, in response to a determination that a character was misidentified, the hand stroke database may be updated to associate the correct character with the hand strokes. Using the example above, a hand stroke database may be updated with an entry to show that "m" is associated with the set of hand strokes that previously were used to identify an "n." In embodiments, hand stroke databases may be associated with particular users or user profiles to provide a spell checking experience personalized to each user.

At 245, in response to a determination that no character was misidentified, it may be determined whether the word is a new word. For example, a word list used to determine whether a word is misspelled at 225 may not be exhaustive, or the word list may not contain esoteric terms. For example, the word list may not contain the esoteric term "immunofixation," and flag it as misspelled. At 245, a user may provide input directing the system to accept "immunofixation" as a new word.

At 250, in response to a determination that the misspelled word is a new word, the new word is added to the word list to prevent future false positives. For example, the esoteric term "immunofixation" may be added to the word list to prevent "immunofixation" from being identified as a misspelled word in the future.

Figure 3:
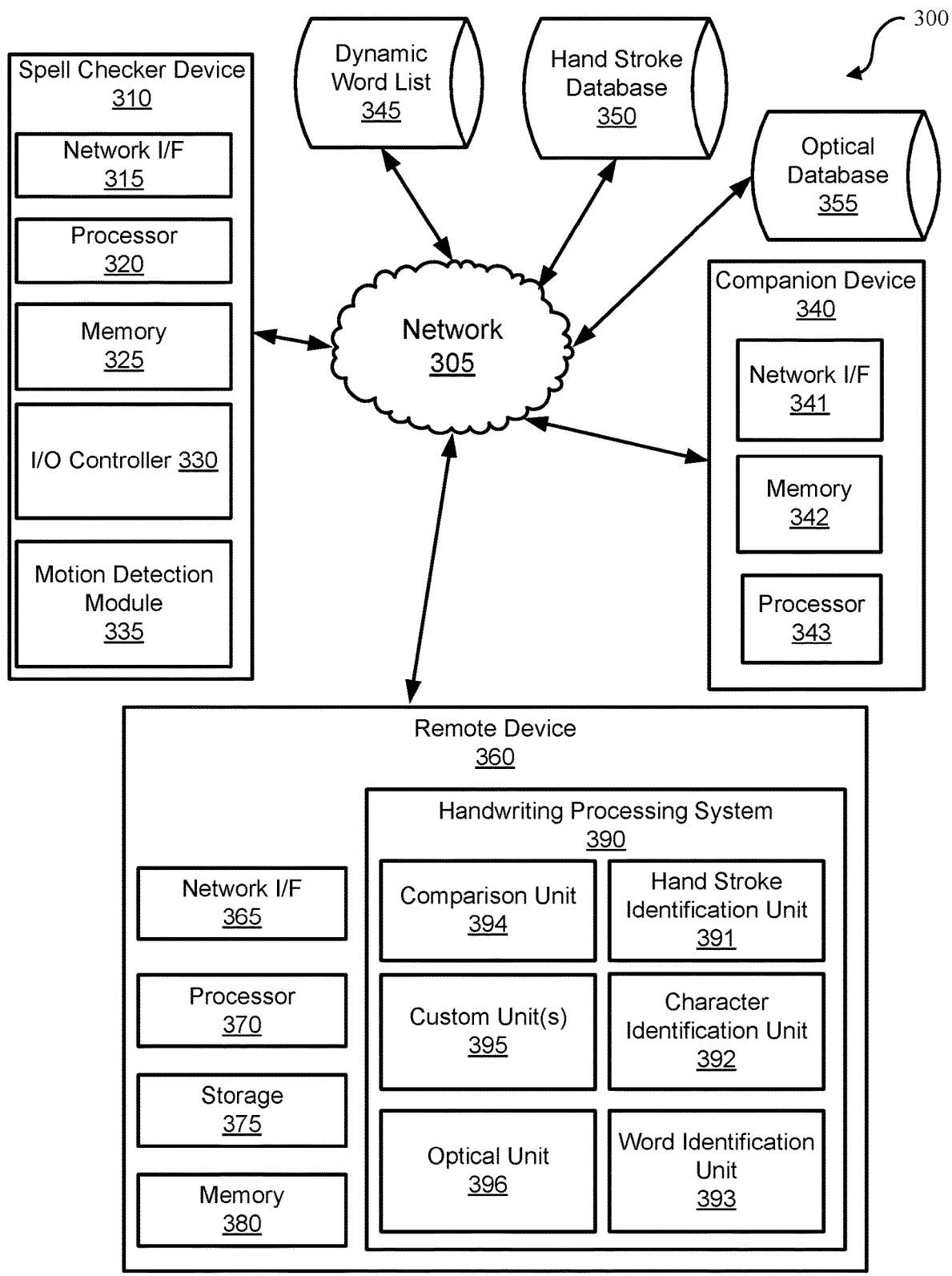
FIG. 3 depicts a block diagram of an example computing environment in which embodiments of the present disclosure may be implemented.

FIG. 3 depicts a block diagram of an example computing environment 300 in which embodiments of the present disclosure may be implemented. In embodiments, the computing environment 300 may include a spell checker device 310, a companion device 340, a remote device 360, a dynamic word list 345, hand stroke database 350, and an optical database 355 communicatively coupled via network 305. In some embodiments, functions of spell checker device 310, companion device 340, remote device 360, dynamic word list 345, hand stroke database 350, and optical database 355 may be implemented using a single device.

Spell checker device 310 may be substantially similar to removable spell checker 120 shown in FIG. 1. Spell checker device 310 may be a computer system, and may include a processor 320, memory 325, network interface 315, I/O controller 330, and motion detection module 335 for tracking the hand positions and hand strokes of a user. In embodiments, spell checker device 310 may generate hand stroke data via motion detection module 335, and send the hand stroke data do remote device 360 for processing by handwriting processing system 390, as described herein. In embodiments, spell checker device 310 may notify the user when a misspelled word is identified. In embodiments, notifications could be vibrations, a tone or other audible signal, activation of a light display, or a text-based message. In embodiments, the spell checker device 310 may be capable of sending user input, such as an indication that a word is misidentified as misspelled, to dynamic word list 345 and to add the word to the word list.

Companion device 340 may be a computer system, and may include a processor 343, memory 342, and a network interface 341. In embodiments, companion device 340 may be a cell phone, a smartphone, a tablet, a desktop computer, a laptop, smart glasses, or any other device capable of sending and receiving information to spell checker device 310 and remote device 360. In embodiments, companion device 340 may be used by another user or an observer to send a signal to the spell checker device 310 to indicate that a handwritten word written by the user is misspelled. In embodiments, companion device 340 may be a device worn or in contact with the user of the spell checker device 310, where companion device 340 performs the notification to the user, as described herein. In embodiments, companion device 340 may be an optical device, such as, for example smart glasses, that may activate a visual display on the smart glasses to superimpose, from the user's reference point, an image of a correctly spelled word over the misspelled version of that word.

Remote device 360 may be a computer system, and may include a processor 370, memory 380, a network interface 365, and tangible storage medium 375. Remote device 390 may include handwriting processing system 390, which may further include a hand stroke identification unit 391 for analyzing hand position data generated by a motion detection module, such as motion detection module 335 to identify hand strokes associated with the hand positions over time. Hand processing system 390 may further include a character identification unit 392 for analyzing hand strokes and, by querying hand stroke database 350, determine the alphanumeric characters the hand strokes represent. Hand processing system 390 may further include a word identification unit 393 for analyzing alphanumeric character strings and breaks in hand strokes to identify the words a user writes. Hand processing system 390 further includes a comparison unit 394 for comparing identified words to dynamic word list 345 to determine whether an identified word is misspelled. Handwriting processing system 390 may further include an optical unit 396 for identifying words in visual representations of handwritten text by analyzing the visual representations and querying an optical database 355 to determine whether a visual representation of a word contains spelling errors and to retrieve a visual representation of the word with correct spelling which may, for example, be sent to an optical companion device for superimposing the correct spelling of a word over a misspelled handwritten word.

The spell checker device 310, companion device 340, and the remote device 360 may be configured to communicate with each other through an internal or external network interface 315, 341, and 365. The network interfaces 315, 341, and 365 may be, e.g., modems, wireless network adapters, Ethernet adapters, etc. The spell checker device 310, companion device 340, and the remote device 360 may be equipped with a display, camera, or monitor. Additionally, the spell checker device 310, companion device 340, and the remote device 360 may include optional input devices (e.g., a keyboard, mouse, scanner, or other input device), and/or any commercially available or custom software (e.g., browser software, communications software, server software, NLP software, search engine, and/or web crawling software, filter modules for filtering content based upon predefined parameters, etc.). In some embodiments, the remote device 360 may be a server, desktop, laptop, or a hand-held device.

The spell checker device 310, companion device 340 and the remote device 360 may be distant from each other and may communicate over a network 305. In embodiments, the remote device 360 may be a central hub from which a spell checker device 310, companion device 340, and other remote devices (not pictured) can establish a communication connection, such as in a client-server networking model. In some embodiments, the spell checker device 310, companion device 340, and remote device 360 may be configured in any other suitable network relationship (e.g., in a peer-to-peer configuration or using another network topology).

In embodiments, the network 305 can be implemented using any number of any suitable communications media. For example, the network 305 may be a wide area network (WAN), a local area network (LAN), the Internet, or an intranet. In certain embodiments, the spell checker device 310, companion device 340, and the remote device 360 may be local to each other, and communicate via any appropriate local communication medium. For example, the spell checker device 310, companion device 340, and the remote device 360 may communicate using a wireless local area network (WLAN), one or more hardwire connections, a wireless link or router, or an intranet. In some embodiments, the spell checker device 310, the remote device 360, and any other devices may be communicatively coupled using a combination of one or more networks and/or one or more local connections. For example, the remote device 360 may be hardwired to the companion device 340 (e.g., connected with an Ethernet cable) while a spell checker device 310 may communicate with the remote device 360 and companion device 340 using the network 305 (e.g., over the Internet).

In some embodiments, the network 305 can be implemented within a cloud computing environment, or using one or more cloud computing services. Consistent with various embodiments, a cloud computing environment may include a network-based, distributed data processing system that provides one or more cloud computing services. Further, a cloud computing environment may include many computers (e.g., hundreds or thousands of computers or more) disposed within one or more data centers and configured to share resources over the network 305.

While FIG. 3 illustrates a computing environment 300 with a single remote device 360, a single spell checker device 310, a single dynamic word list 345, a single hand stroke database 350, a single optical database 355, and a single companion device 340, suitable computing environments for implementing embodiments of this disclosure may include any number of remote devices, spell checker devices, companion devices, dynamic word lists, hand stroke databases, and optical databases. The various models, modules, systems, and components illustrated in FIG. 3 may exist, if at all, across a plurality of devices. For example, some embodiments may include two remote devices two or more companion devices, or two spell checker devices. The two host devices may be communicatively coupled using any suitable communications connection (e.g., using a WAN, a LAN, a wired connection, an intranet, or the Internet).

It is noted that FIG. 3 is intended to depict the representative major components of an exemplary computing environment 300. In some embodiments, however, individual components may have greater or lesser complexity than as represented in FIG. 3, components other than or in addition to those shown in FIG. 3 may be present, and the number, type, and configuration of such components may vary.

Figure 4:
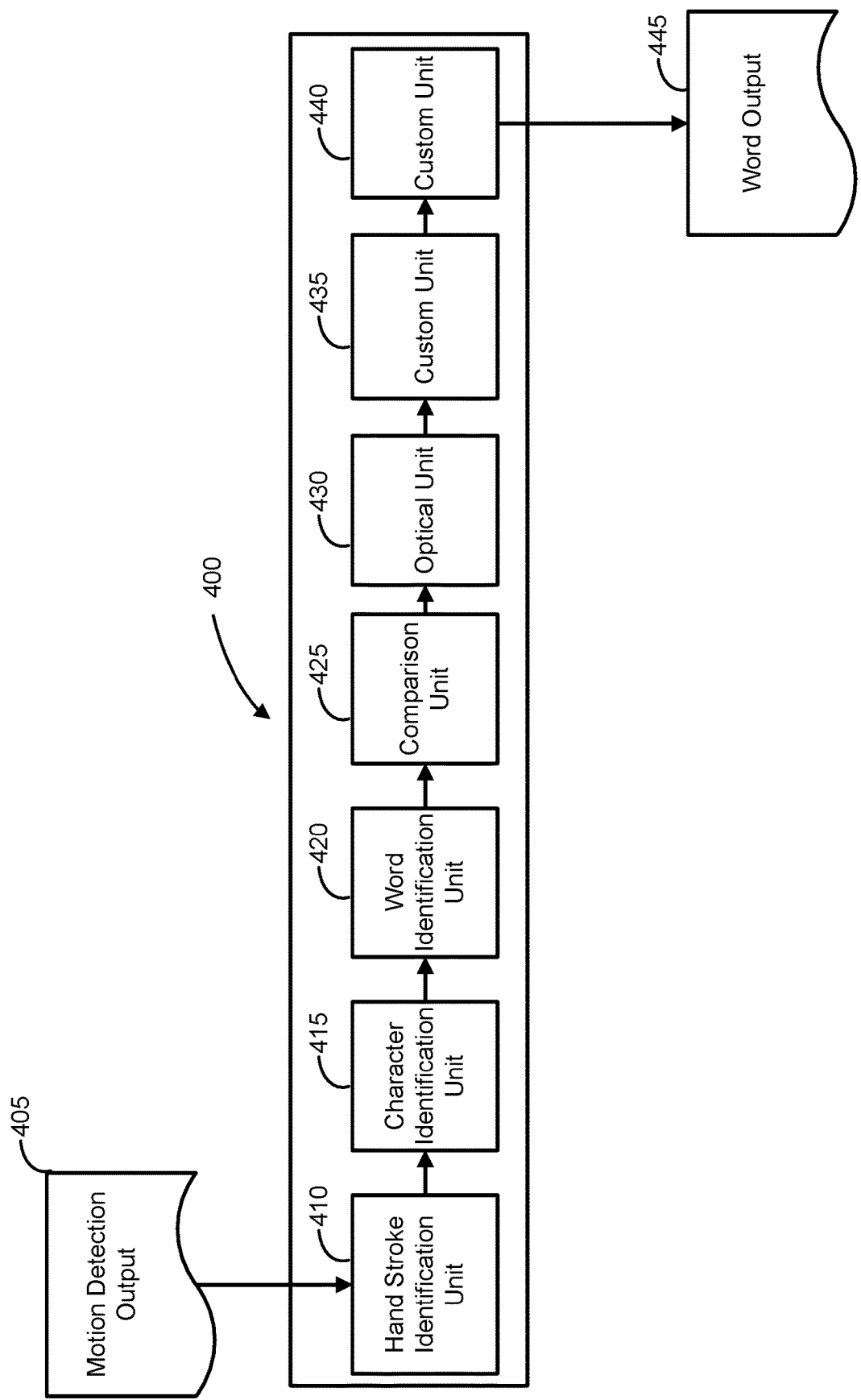
FIG. 4 depicts a flowchart depicting the operations of a handwriting processing system, according to embodiments.

FIG. 4 depicts a flowchart depicting the operations of a handwriting processing system 400, according to embodiments. In embodiments, the operations of a handwriting processing system 400 may be executed in similarly to a Natural Language Processing (NLP) system, such as an Unstructured Information Management Architecture (UIMA) system, or an Optical Character Recognition (OCR) system. The modules 410-440 of the present disclosure may be one or more instructions, routines, fixed function circuits, etc., that may be executed by a processor and read from a memory (e.g., the processor 370 and memory 380 of the remote device 360 shown in FIG. 3). Motion detection output 406 may be analyzed by a hand stroke identification module at 410. For example, when a user writes with a writing instrument attached to a device with a motion sensor, such as the spell checker device 310 shown in FIG. 3, motion detection input may be analyzed to determine the hand strokes the user is making. For example, a hand stroke identification module 410 may analyze position or motion over time to form a plot lines that may be compared to a database of plot lines associated with exemplary hand strokes, or to a set of plot lines created by analyzing pre-recorded hand strokes of the user. For example, if the user writes an "o," the position or motion of a writing instrument may show a set of points forming a circle, over time, which may form a circular plot line. The circular plot line (or any other plot line) may be associated with any number of hand strokes. For example, a circular plot line may correlate to four hand strokes representing the four quarters of the circular plot line (e.g., an upper-left quarter-circle curve hand stroke, an upper-right quarter-circle curve hand stroke, a lower-right quarter-circle curve hand stroke, and a lower-left quarter-circle curve hand stroke). Because handwriting styles may vary from user to user, some embodiments may employ user profiles (e.g., information about a user regarding left or right-handedness, idiosyncratic or irregular hand stroke patterns, writing languages, etc.) to personalize hand stroke libraries/databases for particular users as motion detection input is recorded and analyzed. User profiles and personalized hand stroke databases may enable the handwriting processing system 400 to adapt to, or "learn," a particular user's handwriting style.

Character identification unit 415 may be applied to analyze a sequence of hand strokes to identify characters. For example, a set of hand strokes in a particular order may be associated with a character. For example, a single long hand stroke running from top to bottom may be associated with a manuscript "1."

Word identification unit 420 may be applied to analyze a string of characters to identify words. In embodiments, word identification unit 420 may also take into account pauses or breaks between hand strokes that may indicate spaces between words. For example, the string of characters r-a-c-e-c-a-r may be analyzed to identify the word "racecar." In embodiments, the same string of letters with a break in hand stroke patterns between the "e" and the subsequent "c" may be analyzed to identify the words "race" and "car."

Comparison unit 425 may be applied to compare an identified word to a word list, such as, for example, dynamic word list 345 shown in FIG. 3. The word list may be a standard word list, a custom or esoteric word list, or a personalized word list associated with a particular user's profile. If comparison unit 425 does not find the identified word in the word list, it may be determined that the identified word is misspelled and the handwriting processing system 400 may notify the user, as described herein.

In embodiments, optical unit 430 may be applied to identify words in handwritten text and to identify visual representations of words from an optical database, such as optical database 355 shown in FIG. 3, to enable an optical device, worn by the user, to recognize the user's handwritten text and superimpose visual representations of correctly spelled words over handwritten words the user has misspelled. For example, a user, wearing smart glasses, intelligent contact lenses, or any other optical device communicatively coupled to handwriting processing system 400, may misspell a word while handwriting text. The system may then identify the misspelled word, as described herein, and cause a visual representation of the correctly spelled word to be superimposed over the misspelled word in the handwritten text. For example, if a user writes "crad," the optical device may display one or more correctly spelled words, such as "card," "crab," "cradle," etc. to superimpose over the word "crad" in the user's field of vision.

In embodiments, custom units 435 and 440 may or may not be present. If present, custom units 435 and 440 may represent any number of units. Custom units 435 and 440 may represent units such as: language identification units to determine the language being written; symbol identification units to identify mathematic symbols, numeric characters, diacritic marks; etc.

While handwriting processing system 400, as depicted, includes specific units in a particular order, various embodiments of the present disclosure may include any number of units, and the units may be in alternate orders. The various units illustrated in FIG. 4 may exist, if at all, across a plurality of devices.

Handwriting processing system 400 may result in word output 445. Word output 445 may be, for example, a correct spelling of a word displayed to the user on, for example, display 124 shown in FIG. 1, or a visual representation of a correctly spelled word superimposed over a misspelled word, as described herein.

Figure 5:
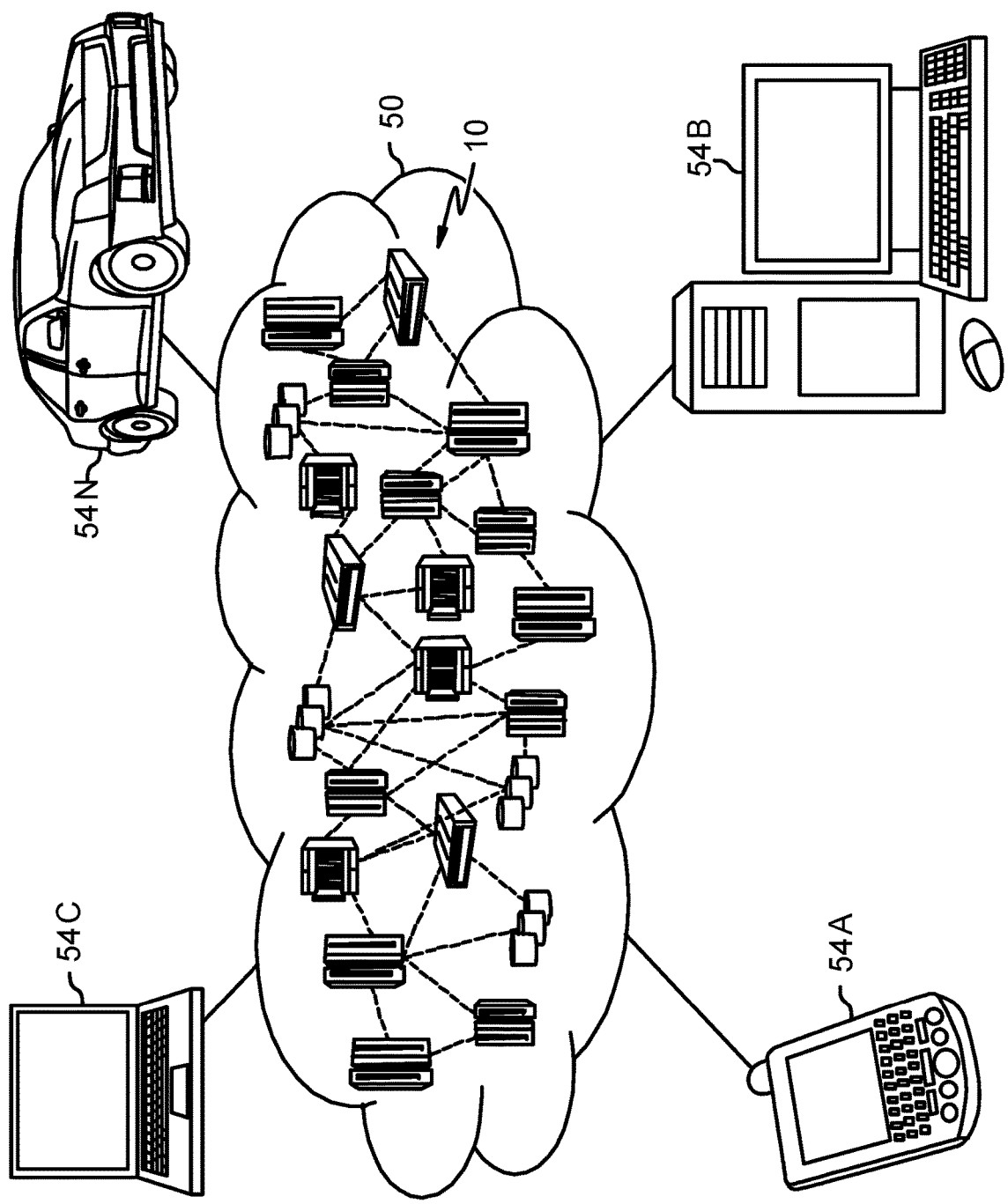
FIG. 5 depicts a cloud computing environment according to an embodiment of the present invention.

Referring now to FIG. 5, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
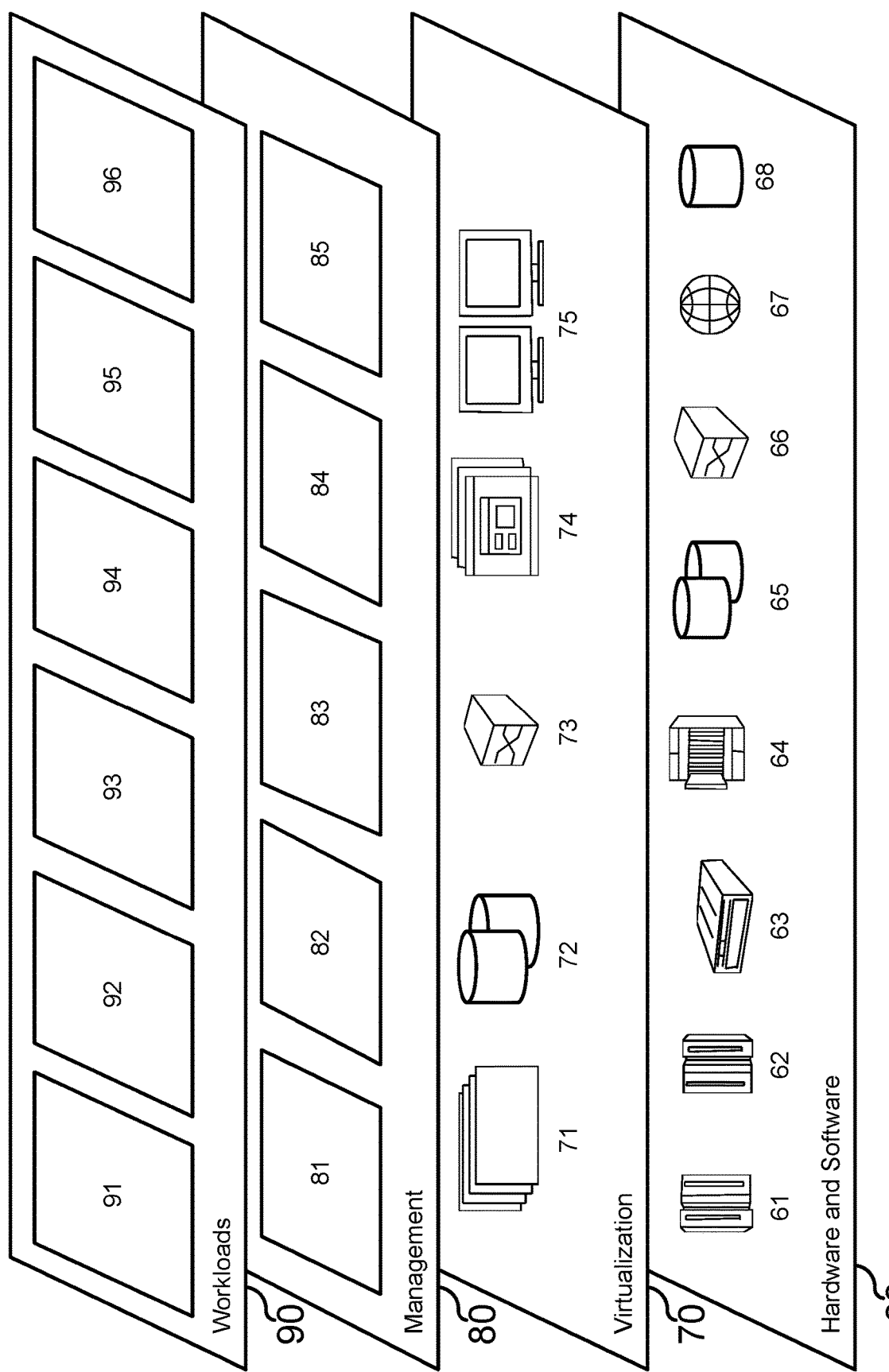
FIG. 6 depicts abstraction model layers according to an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and handwritten text spell checking 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for spell checking handwritten text, the method comprising:

identifying, by a stroke detection module of a spell checker device including a bistable metal spring and a motion detecting sensor and encompassing, at least partially, a writing instrument, hand strokes made using a writing instrument, the spell checker device removably attached to the writing instrument, wherein the spell checker device is adaptable to removably attaching to a plurality of writing instruments of various sizes;

identifying, based on the one or more hand strokes, one or more characters;

identifying, based on the one or more characters, a word;

determining the word is misspelled, wherein determining the word is misspelled comprises:

comparing the word to a dynamic list of words, the dynamic list of words including at least one word added by a user;

receiving input indicating the word is a new word;

storing the new word in the dynamic list of words; and in response to determining the word is misspelled, notifying the user.

2. The method of claim 1 wherein notifying the user further comprises:

displaying, on the spell checker device, the word; and displaying, on the spell checker device, at least two alternative spellings of the word.

3. The method of claim 1, further comprising displaying the word and at least one alternative spelling on a companion device worn by a user, wherein the companion device includes one or more from a group consisting of a wearable device, an earbud, a smartphone, a tablet, a laptop, a desktop computer, an optical device, and smart glasses.

4. The method of claim 3, wherein the companion device includes an optical device worn by the user, and wherein displaying the word includes superimposing, by the optical device, the at least one alternative spelling over the misspelled word.

5. The method of claim 4, wherein the method further comprises:

receiving information about the user;

analyzing the information to form a hand stroke profile tailored to the user, the hand stroke profile associating sets of hand strokes to characters, wherein the sets of hand strokes are generated by detecting the user's hand positions over time, and wherein associating sets of hand strokes to characters causes the spell checker device to adapt to the user's handwriting style, and wherein the sets of hand strokes include a database of hand strokes captured from a plurality of users;

responsive to determining the word is misspelled, determining one or more characters are misidentified;

identifying a correct character; and responsive to identifying the correct character, assigning the set of hand strokes associated with the misidentified character to the correct character in the hand stroke profile.

6. The method of claim 1, wherein determining whether the word is misspelled comprises:

receiving input from a second user indicating that the word is misspelled.

7. The method of claim 6, wherein the input received from the second user is obtained via a streaming application running on a second companion device, and wherein the notification to the user includes a vibration, an activation of a light display, and a text-based message.

8. The method of claim 1, wherein software is provided as a service in a cloud environment to perform the steps of:

identifying, based on the one or more hand strokes, one or more characters;

identifying, based on the one or more characters, a word; and determining whether the word is misspelled.

9. The method of claim 1, wherein notifying the user includes sending a notification to the user via a streaming application.

10. The method of claim 1, wherein a writing instrument is selected from a group consisting of pencils, pens, markers, highlighters, whiteboard markers, chalk sticks, and styli.

11. The method of claim 1, further comprising:

determining the one or more characters are correctly identified;

determining the word is a new word; and adding the new word to the dynamic list of words.

12. The method of claim 11, wherein natural language processing techniques are used to identify one or more contextual clues, the contextual clues enabling the spell checker device to determine the one or more characters are correctly identified.

13. A computer program product for spell checking handwritten text, the computer program product comprising a computer readable storage medium having program instructions embodied therewith, the program instructions executable by a device to cause the device to:

identify, by a stroke detection module of a spell checker device including a bistable metal spring and a motion detecting sensor and encompassing, at least partially, a writing instrument, hand strokes made using a writing instrument, the spell checker device removably attached to the writing instrument, wherein the spell checker device is adaptable to removably attaching to a plurality of writing instruments of various sizes;

identify, based on the one or more hand strokes, one or more characters;

identify, based on the one or more characters, a word;

determine the word is misspelled, wherein determining the word is misspelled comprises:

comparing the word to a dynamic list of words, the dynamic list of words including at least one word added by a user;

receiving input indicating the word is a new word;

storing the new word in the dynamic list of words; and in response to determining the word is misspelled, notify the user.

14. The computer program product of claim 13, wherein the program instructions further cause the device to:

superimpose the at least one alternative spelling over the misspelled word using an optical device worn by the user.

15. The computer program product of claim 14, wherein the program instructions further cause the device to:

receive information about the user;

analyze the information to form a hand stroke profile tailored to the user, the hand stroke profile associating sets of hand strokes to characters, wherein the sets of hand strokes are generated by detecting the user's hand positions over time, and wherein associating sets of hand strokes to characters causes the spell checker device to adapt to the user's handwriting style, and wherein the sets of hand strokes include a database of hand strokes captured from a plurality of users;

responsive to determining the word is misspelled, determine one or more characters are misidentified;

identify a correct character; and responsive to identifying the correct character, assign the set of hand strokes associated with the misidentified character to the correct character in the hand stroke profile.

16. The computer program product of claim 13, wherein software is provided as a service in a cloud environment to perform the steps of:

identifying, based on the one or more hand strokes, one or more characters;

identifying, based on the one or more characters, a word; and determining whether the word is misspelled.

17. A system for spell checking handwritten text, the system comprising:
 a memory with program instructions stored thereon; and
 a processor in communication with the memory, wherein the processor is configured to perform a method, the method comprising:
  identifying, by a stroke detection module of a spell checker device including a bistable metal spring and a motion detecting sensor and encompassing, at least partially, a writing instrument, hand strokes made using a writing instrument, the spell checker device removably attached to the writing instrument, wherein the spell checker device is adaptable to removably attaching to a plurality of writing instruments of various sizes;
  identifying, based on the one or more hand strokes, one or more characters;
  identifying, based on the one or more characters, a word;
  determining the word is misspelled, wherein determining the word is misspelled comprises:
   comparing the word to a dynamic list of words, the dynamic list of words including at least one word added by a user;
   receiving input indicating the word is a new word;
   storing the new word in the dynamic list of words; and
  in response to determining the word is misspelled, notifying the user.

18. The system of claim 17, wherein the method further comprises:
 superimposing the at least one alternative spelling over the misspelled word using an optical device worn by the user.

19. The system of claim 18, wherein the method further comprises:
 receiving information about the user;
 analyzing the information to form a hand stroke profile tailored to the user, the hand stroke profile associating sets of hand strokes to characters, wherein the sets of hand strokes are generated by detecting the user's hand positions over time, and wherein associating sets of hand strokes to characters causes the spell checker device to adapt to the user's handwriting style, and wherein the sets of hand strokes include a database of hand strokes captured from a plurality of users;
 responsive to determining the word is misspelled, determining one or more characters are misidentified;
 identifying a correct character; and
 responsive to identifying the correct character, assigning the set of hand strokes associated with the misidentified character to the correct character in the hand stroke profile.

20. The system of claim 17, wherein software is provided as a service in a cloud environment to perform the steps of:
 identifying, based on the one or more hand strokes, one or more characters;
 identifying, based on the one or more characters, a word; and
 determining the word is misspelled.

* * * * *